United States Patent
Chang et al.

(10) Patent No.: US 10,341,324 B2
(45) Date of Patent: *Jul. 2, 2019

(54) SPONSORED TRUST RELATIONSHIP MANAGEMENT BETWEEN MULTIPLE RACKS

(71) Applicant: International Business Machines Corporation, Armonk, NY (US)

(72) Inventors: John Yow-Chun Chang, Austin, TX (US); Ching-Yun Chao, Austin, TX (US); Patrick L. Davis, Pflugerville, TX (US); Rohan Gandhi, Cedar Park, TX (US); Yuhsuke Kaneyasu, Tokyo (JP); Lewis Lo, Toronto (CA); Ki H. Park, Cary, NC (US); Ankit Patel, Austin, TX (US); Kin Ueng, Austin, TX (US); Iqbal M. Umair, Mississauga (CA); Leonardo A. Uzcategui, Westminster, CO (US); Barbara J. Vander Weele, Austin, TX (US)

(73) Assignee: International Business Machines Corporation, Armonk, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 15/959,581

(22) Filed: Apr. 23, 2018

(65) Prior Publication Data
US 2018/0241737 A1   Aug. 23, 2018

Related U.S. Application Data

(63) Continuation of application No. 14/951,835, filed on Nov. 25, 2015, now Pat. No. 9,985,954.

(51) Int. Cl.
*H04L 9/30* (2006.01)
*H04L 29/06* (2006.01)
*H04L 9/32* (2006.01)

(52) U.S. Cl.
CPC ............ *H04L 63/0807* (2013.01); *H04L 9/30* (2013.01); *H04L 9/302* (2013.01); *H04L 9/3242* (2013.01); *H04L 63/0869* (2013.01)

(58) Field of Classification Search
CPC ... H04L 9/14; H04L 9/30; H04L 9/006; H04L 9/302; H04L 41/12; H04L 41/24;
(Continued)

(56) References Cited

U.S. PATENT DOCUMENTS 5,768,519 A * 6/1998 Swift .................. G06F 21/6218
707/999.009
7,181,614 B1 * 2/2007 Gehrmann ............ H04L 63/065
709/249

(Continued)

FOREIGN PATENT DOCUMENTS

JP     2011072006 A     4/2011

OTHER PUBLICATIONS

List of IBM Patents or Patent Applications Treated as Related, Filed Apr. 23, 2018. 2 pages.

(Continued)

*Primary Examiner* — Joseph P Hirl
*Assistant Examiner* — Kalish K Bell
(74) *Attorney, Agent, or Firm* — Daniel Yeates (57) ABSTRACT

A new management node associated with a new rack sends at least a public key of the new management node to a first management node associated with a first rack and a plurality of autonomous management nodes. The first management node sends the new management node an access token trusted by at least a portion of the plurality of autonomous management nodes and a set of public keys corresponding to at least a portion of the plurality of autonomous management nodes. The new management node can send its public key and the access token to at least a portion of the plurality of (Continued)

autonomous management nodes. In response, the new management node can establish a mutual trust relationship with at least a portion of the plurality of autonomous management nodes.

17 Claims, 6 Drawing Sheets

(58) Field of Classification Search
CPC ......... H04L 41/28; H04L 63/06; H04L 63/10; H04L 63/20; H04L 63/061; H04L 63/0869; G06F 21/00; G06F 21/30; G06F 21/44; G06F 21/45; G06F 21/62; G06F 21/78; G06F 21/445
See application file for complete search history.

(56) References Cited

U.S. PATENT DOCUMENTS

| | | | |
|---|---|---|---|
| 8,737,410 B2 | 5/2014 | Davis | |
| 8,856,308 B1 | 10/2014 | Bollay | |
| 8,924,723 B2 | 12/2014 | Chang | |
| 8,930,693 B2 | 1/2015 | Holt | |
| 8,943,319 B2 | 1/2015 | Chang | |
| 9,148,285 B2 | 9/2015 | Chang | |
| 9,160,731 B2 | 10/2015 | Chang | |
| 9,906,370 B2 | 2/2018 | Apte et al. | |
| 9,985,954 B2* | 5/2018 | Chang | H04L 63/0807 |
| 2004/0210767 A1 | 10/2004 | Sinclair | |
| 2005/0111668 A1 | 5/2005 | Raikar | |
| 2009/0055646 A1* | 2/2009 | Sussland | G06F 21/445 713/168 |
| 2011/0016307 A1* | 1/2011 | Killian | H04L 9/0825 713/151 |
| 2012/0066502 A1 | 3/2012 | Borneman | |
| 2012/0233463 A1 | 9/2012 | Holt | |
| 2012/0257756 A1 | 10/2012 | Huang | |
| 2014/0298091 A1* | 10/2014 | Carlen | H04L 65/80 714/15 |
| 2014/0317716 A1 | 10/2014 | Chao | |
| 2015/0074395 A1 | 3/2015 | Chang | |
| 2016/0127341 A1 | 5/2016 | Yan | |
| 2017/0041296 A1 | 2/2017 | Ford | |
| 2017/0134302 A1 | 5/2017 | Chang | |
| 2017/0149765 A1 | 5/2017 | Chang et al. | |
| 2017/0149794 A1 | 5/2017 | Linnakangas et al. | |

OTHER PUBLICATIONS

Cunsolo, et al., "GS3: a Grid Storage System with Security Features", J Grid Computing (2010) 8:391-418.
Lee et al., "Traust: A Trust Negotiation-Based Authorization Service for Open Systems", SACMAT'06, Jun. 7-9, 2006. 10 pages.
Mell, et al., "The NIST Definition of Cloud Computing" Recommendations of the National Institute of Standards and Technology, NIST Special Publication 800-145. Sep. 2011. 7 pages.
Parameswari, et al., "A Trust, Privacy and Security Infrastructure for the Inter-Cloud", G C Priya et al,Int.J.Computer Technology & Applications,vol. 3 (2), pp. 691-695.

* cited by examiner

SPONSORED TRUST RELATIONSHIP MANAGEMENT BETWEEN MULTIPLE RACKS

BACKGROUND

The present disclosure relates to secure communication amongst components of a network, and, more specifically, to establishing trust relationships between various racks in a data center.

SUMMARY

Aspects of the present disclosure relate to a computer program product, a system, and a method for establishing a trust relationship amongst a plurality of racks. The computer-implemented method can comprise sending a request by a new management node associated with a new rack to a first management node associated with a first rack. The request can include a public key of the new management node. The first management node can be associated with a plurality of autonomous management nodes such that a respective mutual trust relationship exists between at least a portion of the management nodes of the plurality of autonomous management nodes. Each respective management node can independently manage a respective rack comprising a plurality of computing devices. The method can further comprise receiving, by the new management node and from the first management node, a new access token and a set of respective public keys corresponding to a set of respective management nodes of the plurality of autonomous management nodes. The new access token can be trusted by each respective management node of the set of management nodes, and, as a result of the sending and the receiving, the new management node and the first management node can establish a mutual trust relationship. The method can further comprise sending, by the new management node and to one or more respective management nodes of the set of management nodes, the public key of the new management node and the new access token. The method can further comprise establishing, based on the sending, a respective mutual trust relationship between the new management node and the one or more respective management nodes receiving the public key and the new access token of the new management node.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

While the present disclosure is amenable to various modifications and alternative forms, specifics thereof have been shown by way of example in the drawings and will be described in detail. It should be understood, however, that the intention is not to limit the present disclosure to the particular embodiments described. On the contrary, the intention is to cover all modifications, equivalents, and alternatives falling within the spirit and scope of the present disclosure.

DETAILED DESCRIPTION

Aspects of the present disclosure relate to establishing a trust relationship between a plurality of components in a network. In some embodiments, the two or more components comprise various types of servers or groups of servers communicatively coupled to one another via a local (e.g., physical) or distributed (e.g., virtual) network. However, in additional embodiments, the two or more components may be other devices, such as personal computers, mobile devices, workstations, and so on which may benefit from establishing a trust relationship with one or more similar or dissimilar components of a network.

Some embodiments of the present disclosure relate to trust relationships between two or more racks. According to the present disclosure, the term "rack" should be construed to mean a set of nodes. The nodes can comprise network components, networking devices, storage devices, servers, blades, or other components according to various embodiments of the present disclosure. Each rack can include a management node. The management node can manage the operations of the various components comprising the rack. The management node can also communicate and interact with other management nodes of other racks. Thus, a plurality of management nodes overseeing a plurality of respective racks can be communicatively coupled together to form, for example, a data center capable of improved storage, processing, or other computational operations.

Some embodiments of the present disclosure relate to a data center containing multiple racks. The multiple racks can share resources to improve the flexibility and capability of the data center. Some aspects of the present disclosure describe a system in which a new management node can establish a trust relationship with a first management node associated with a data center. The trust relationship with the first management node can be used to establish trust relationships with other management nodes associated with the data center.

The distribution of confidential data between a plurality of components connected to one another via a physical or a virtual network can benefit from various security measures to protect the confidentiality of the data and preserve the integrity of the components. One security measure is public key infrastructure (PKI). PKI can comprise a public key, a private key, and a certificate of authority. A public key can be shared with other network components while a private key can be kept confidential to an individual network component. The public key and the private key can be related by an algorithm that is impractical to determine based on knowledge of the public key alone. The certificate of authority can be used to authenticate a public key by verifying the ownership of a public key. A certificate of authority can be, but is not limited to, a X.509 security certificate. Public-private key systems can include, but are not limited to, the Rivest, Shamir, and Adleman (RSA) public-private key cryptography system. In some cases, a security token, such as a password, is used in addition to, or in lieu of, other aspects of the PKI.

Protocols for establishing trust relationships are known to one of skill in the art. For example, illustrative trust establishment protocols which can be used with the techniques discussed herein are described in more detail in U.S. patent application Ser. No. 13/865,692, U.S. patent application Ser. No. 13/745,942, and U.S. patent application Ser. No. 14/019,836. Thus, trust relationships, including the use of PKI technology, public and private keys, certificates of authority, and security tokens (also referred to as access tokens herein) will not be described in further detail herein. It should be understood that advancements in trust relationships which simplify, expedite, or otherwise improve upon known methods, mechanisms, and/or protocols fall within the spirit and scope of the present disclosure.

Advantageously, some embodiments of the present disclosure reduce the number of operations associated with establishing a trust relationship in a multi-rack system and improve the flexibility of the trust establishment process.

Embodiments of the present disclosure can reduce the number of operations associated with establishing a trust relationship by using a sponsored trust relationship approach. Thus, if a first management node trusts a second management node and the second management node trusts a third management node, then the first management node can trust the third management node based on the common trust relationship with the second management node.

Embodiments of the present disclosure can improve the flexibility of the trust establishment process by enabling any management node of a plurality of management nodes to sponsor a new management node. Thus, only one management node of the plurality of management nodes is required to be online to initiate the trust establishment process.

It is to be understood that the aforementioned advantages are only illustrative of some advantages occurring in some embodiments of the present disclosure. Some embodiments of the present disclosure may exhibit all, some, or none of the aforementioned advantages while remaining within the spirit and scope of the present disclosure.

It is to be understood in advance that although this disclosure includes a detailed description on cloud computing, implementation of the teachings recited herein are not limited to a cloud computing environment. Rather, various embodiments are capable of being implemented in conjunction with any other type of computing environment.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 1:
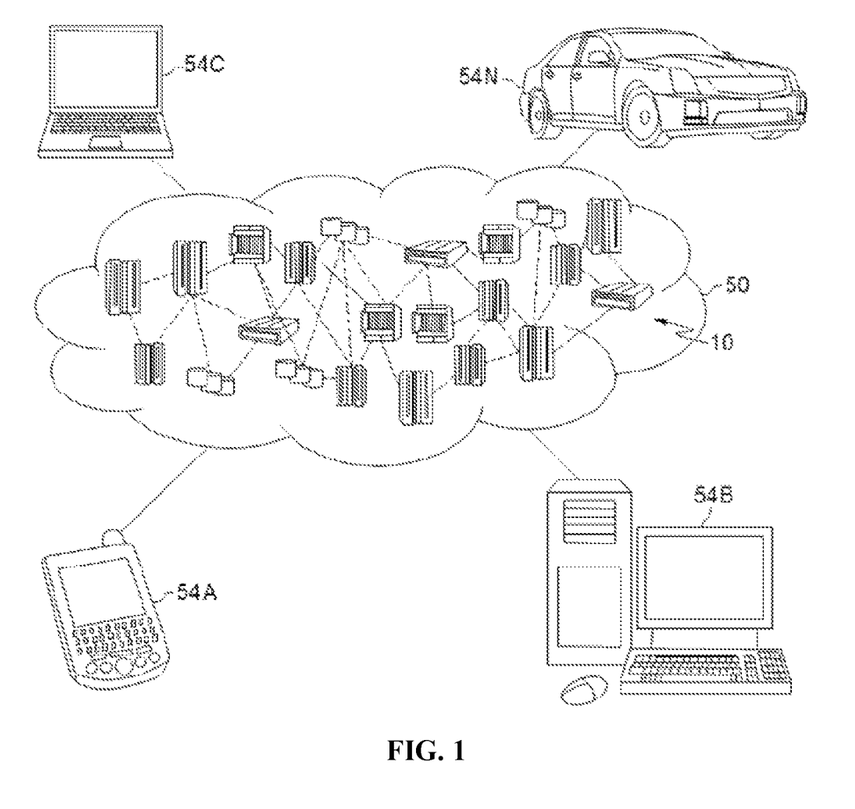
FIG. 1 depicts a cloud computing environment according to some embodiments of the present disclosure.

Referring now to FIG. 1, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser). According to various embodiments of the present disclosure, the methods described hereinafter with reference to FIGS. 4-6 can be implemented by one or more cloud computing nodes 10 of FIG. 1.

Figure 2:
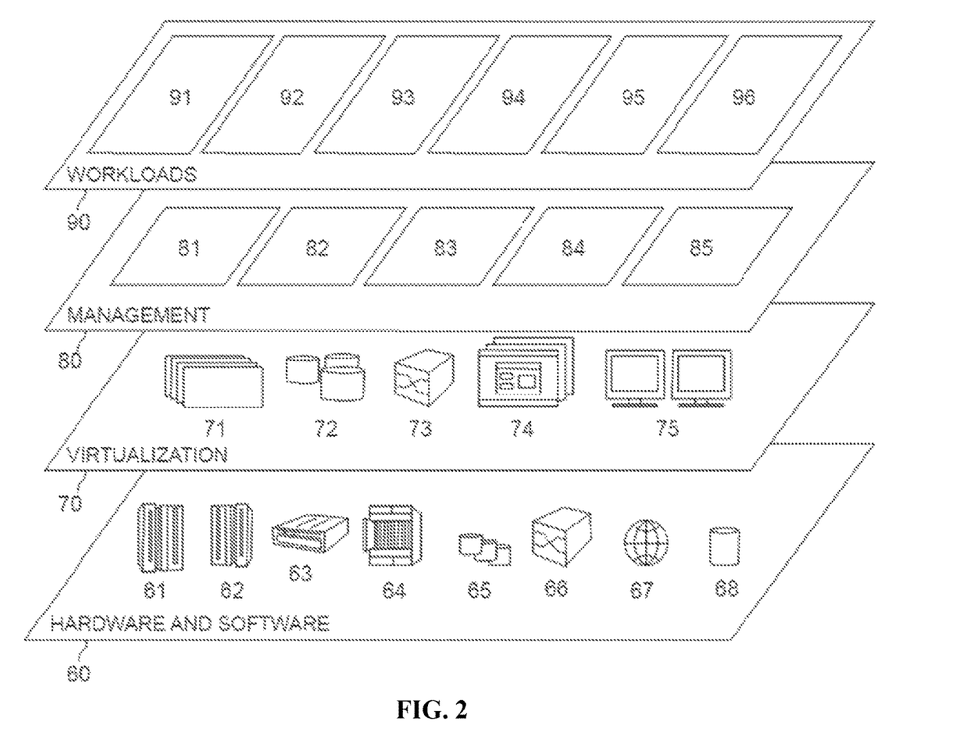
FIG. 2 depicts abstraction model layers according to some embodiments of the present disclosure.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture-based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and mobile desktop 96. According to various embodiments, the methods described hereinafter with respect to FIG. 4-6 can be implemented by one or more components appearing in hardware and software layer 60 of FIG. 2.

Figure 3:
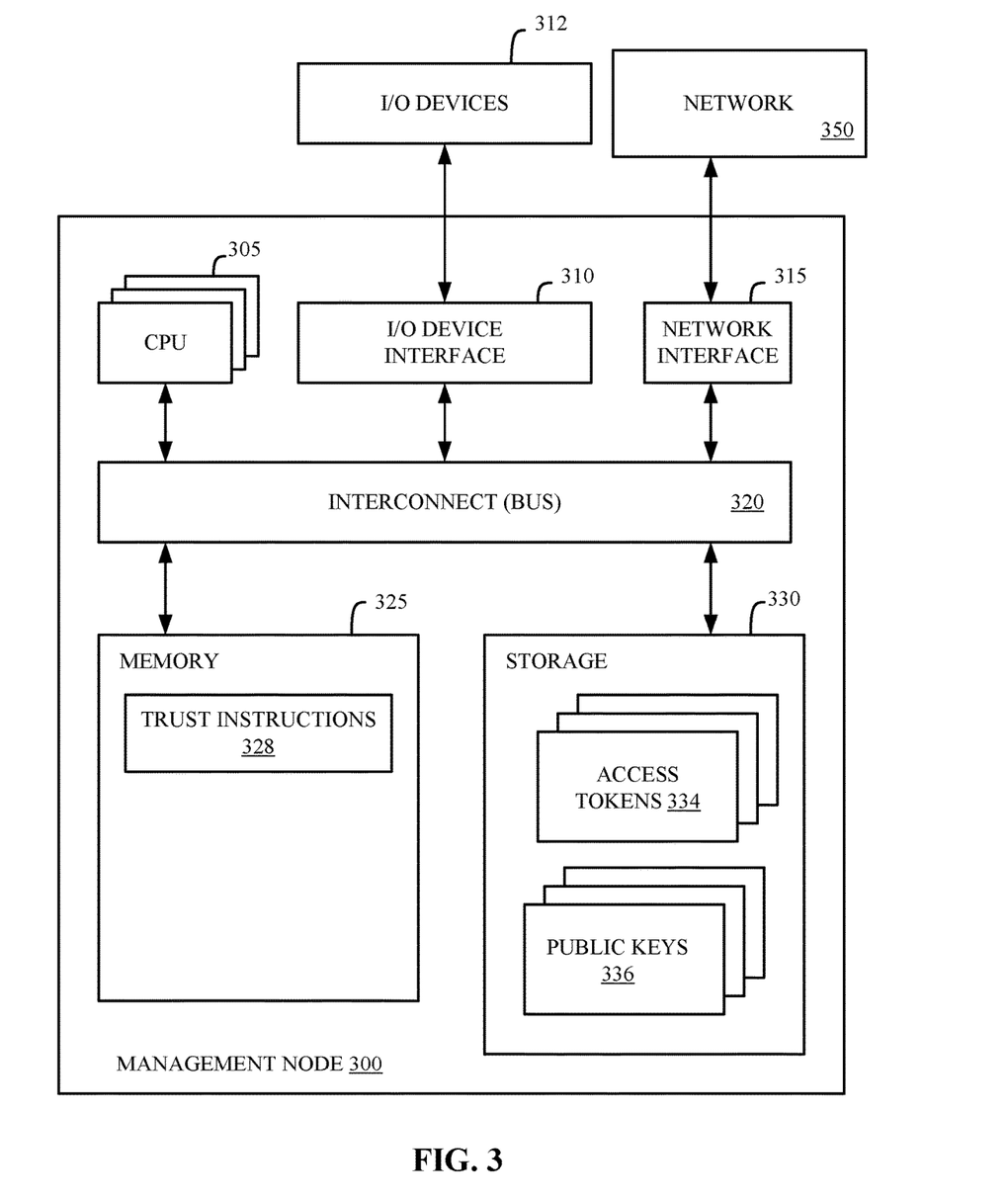
FIG. 3 illustrates a block diagram of a management node in accordance with some embodiments of the present disclosure.

Referring now to FIG. 3, shown is a block diagram of a management node according to some embodiments of the present disclosure. In some embodiments, the management node is the same or substantially the same as an illustrative component appearing in hardware and software layer 60 of FIG. 2 and/or a cloud computing node 10 of FIG. 1. However, the management node 300 is not limited exclusively to the aforementioned examples. Rather, the management node 300 can, in some embodiments, comprise components appearing in other aspects of FIG. 1 and FIG. 2 where the alternative component can benefit from establishing a trust relationship with one or more similar or dissimilar components.

In various embodiments, the management node 300 includes a memory 325, storage 330, an interconnect (e.g., BUS) 320, one or more processors (e.g., CPUs) 305, an I/O device interface 310, I/O devices 312, and a network interface 315.

Each CPU 305 retrieves and executes programming instructions stored in the memory 325 or storage 330. The interconnect 320 is used to move data, such as programming instructions, between the CPU 305, I/O device interface 310, storage 330, network interface 315, and memory 325. The interconnect 320 can be implemented using one or more busses. The CPUs 305 can be a single CPU, multiple CPUs, or a single CPU having multiple processing cores in various embodiments. In some embodiments, a processor 305 can be a digital signal processor (DSP). Memory 325 is generally included to be representative of a random access memory (e.g., static random access memory (SRAM), dynamic random access memory (DRAM), or Flash). The storage 330 is generally included to be representative of a non-volatile memory, such as a hard disk drive, solid state device (SSD), removable memory cards, optical storage, or flash memory devices. In an alternative embodiment, the storage 330 can be replaced by storage area-network (SAN) devices, the cloud, or other devices connected to the management node 300 via the I/O devices 312 or a communication network via the network interface 315.

In some embodiments, the memory 325 stores trust instructions 328 and the storage 330 stores one or more access tokens 334 and one or more public keys 336. However, in various embodiments, the trust instructions 328, the access tokens 334, and the public keys 336 are stored partially in memory 325 and partially in storage 330, or they are stored entirely in memory 325 or entirely in storage 330, or they are accessed over a network via the network interface 315.

Figure 4:
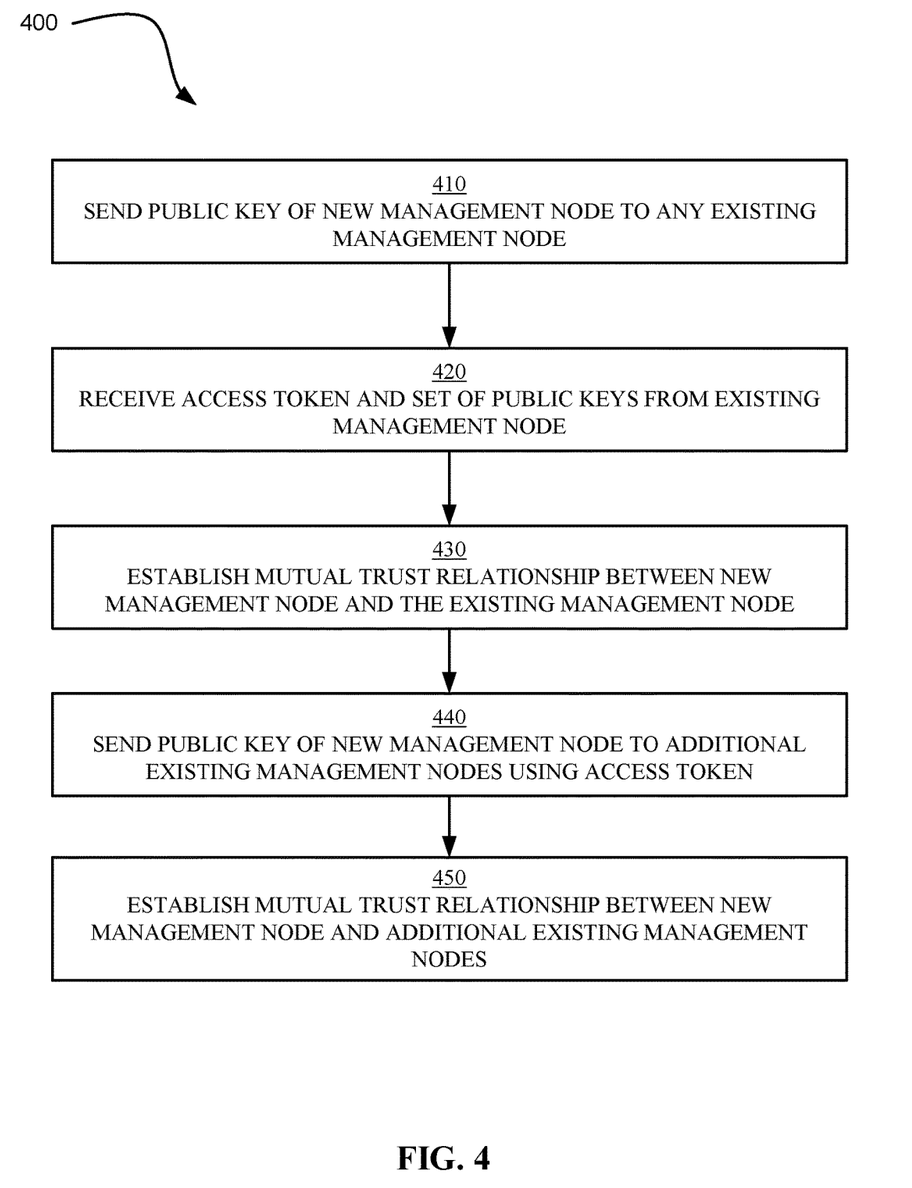
FIG. 4 illustrates a flowchart for an example method for establishing mutual trust relationships between a new management node and existing management nodes of a network in accordance with some embodiments of the present disclosure.
Figure 5:
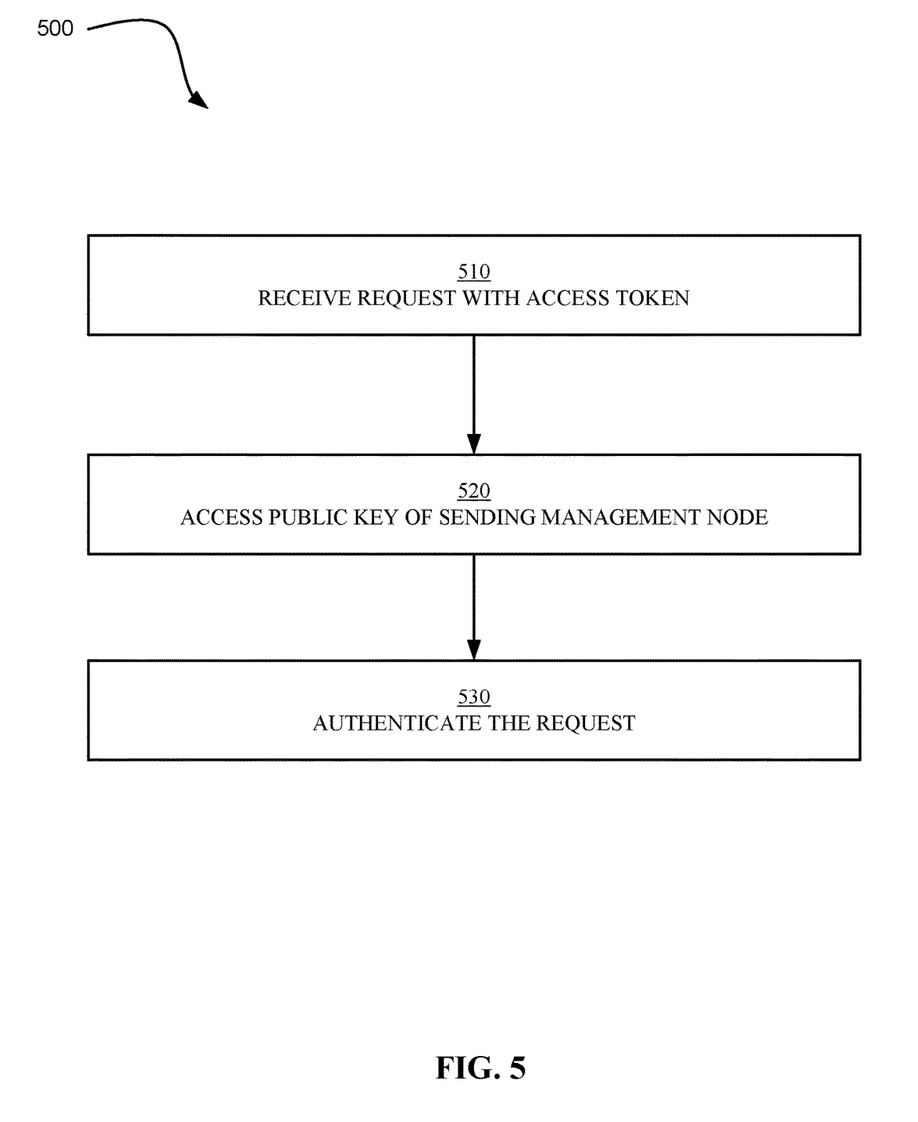
FIG. 5 illustrates a flowchart of an example method for authenticating a request in accordance with some embodiments of the present disclosure.
Figure 6:
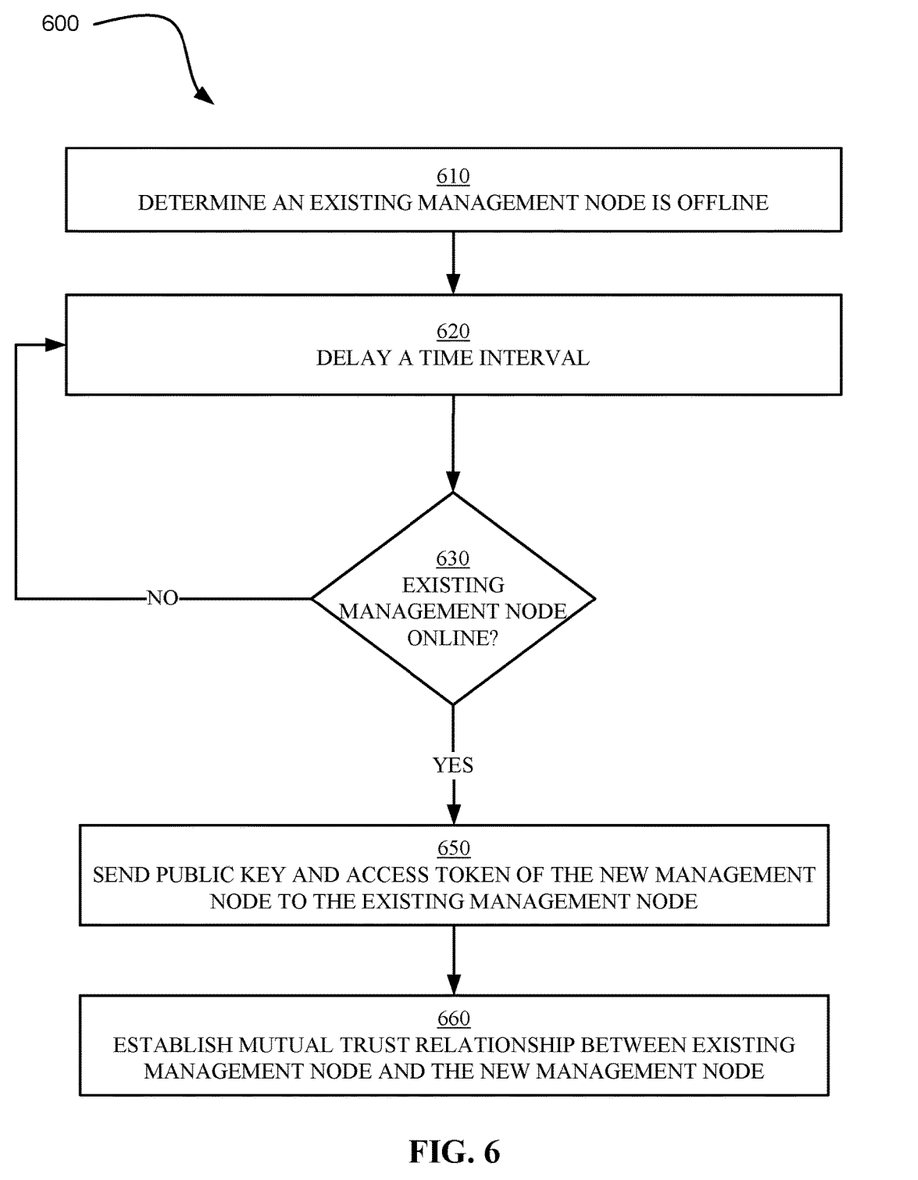
FIG. 6 illustrates a flowchart of a method for establishing a trust relationship between a new management node and an offline management node in accordance with some embodiments of the present disclosure.

The trust instructions 328 (also referred to herein as instructions 328) can store processor executable instructions for various methods such as the methods shown and described with respect to FIG. 4-6. The access tokens 334 can comprise one or more security tokens that identifies, verifies, expedites, improves, and/or enables communication between one or more management nodes having a mutual trust relationship with the management node 300. The public keys 336 can comprise, for example, public RSA keys. Although not shown, the storage 330 can also contain one or more certificates of authority (e.g., X.509 certificates) in accordance with some embodiments of the present disclosure.

In various embodiments, the I/O devices 312 can include an interface capable of presenting information and receiving input. The network 350 can comprise a network connecting a plurality of racks wherein each respective rack is controlled by a respective management node and wherein each respective management node shares a mutual trust relationship with at least a portion of the other management nodes of the network. In some embodiments, the network 350 can be the same or substantially the same as cloud computing environment 50.

Referring now to FIG. 4, shown is a flowchart for an example method 400 of establishing mutual trust relationships between a new management node and existing management nodes of a network in accordance with some embodiments of the present disclosure. The method 400 can be implemented by one or more processors (e.g., CPUs 305) executing a set of instructions (e.g., trust instructions 328).

The method 400 can begin with operation 410 in which a new management node sends a public key of the new management node and a request to any existing management node of the network.

In operation 420, the new management node can receive an access token and a set of public keys from the existing management node of the network. The access token can comprise a security token signed by a private key of the existing management node, such as, for example, a private RSA key. The public keys can comprise public RSA keys of one or more management nodes associated with the network. In some embodiments, the set of public keys comprises a respective public key for each respective management node of the plurality of autonomous management nodes.

In operation 430, a mutual trust relationship can be established between the new management node and the existing management node. The mutual trust relationship can be a result of the existing management node receiving a public key of the new management node, and the new management node receiving a public key and an access token associated with the existing management node. In some embodiments, operation 430 can further comprise issuing an access token from the new management node to the existing management node.

In some embodiments, the mutual trust relationship is additionally established or alternatively established in response to an input received by an interface of the existing management node. In some embodiments, the input is a user input where the user is, for example, an administrator of the network.

In operation 440, the new management node can send the public key of the new management node and the access token received from the existing management node to one or more additional existing management nodes associated with the network. The new management node can use respective public keys of the set of public keys to send each respective message to a respective management node.

In operation 450, a mutual trust relationship can be established between the new management node and the one or more additional existing management nodes as a result of sending the message. In some embodiments, the operation 450 can further comprise determining that the access token received from the new management node is signed by a private key of an existing management node that already shares a trust relationship with each respective additional existing management node. In various embodiments, said access token can be identical to the access token received from the existing management node, while in alternative embodiments, said access token can be a new access token created based on information stored in the access token received by the new management node from the existing management node. In some embodiments, operation 450 can further comprise receiving an access token from each additional existing management node to complete the mutual trust relationship.

In some embodiments, operation 440 comprises sending a respective public key to each respective management node of the plurality of autonomous management nodes and operation 450 can comprise establishing a mutual trust relationship with each management node of the plurality of autonomous management nodes.

Although not shown, the method 400 can comprise establishing trust relationships between additional new management nodes and existing management nodes. In such embodiments, a new management node can sponsor a second new management node. The new management node can supply access tokens and public keys to additional new management nodes according to various embodiments of the present disclosure. Thus, in some embodiments, the new management node can receive a request including a public key of a second new management node. In response to receiving the request, the new management node can send a second access token and a second set of public keys to the second new management node. The second access token can be trusted by at least a portion of the plurality of autonomous management nodes. In some embodiments, the second access token is identical to the access token received from the first existing management node by the new management node. The second set of public keys can correspond to a second set of management nodes of the plurality of autonomous management nodes. In some embodiments, the second set of public keys can be the same as the set of public keys sent from the first existing management node to the new management node.

The new management node and the second new management node can establish a mutual trust relationship as a result of sending and receiving public keys and access tokens. The second new management node can subsequently send messages to a portion of the plurality of autonomous management nodes using a respective public key and the second access token. The messages can establish a mutual trust relationship between the second new management node and the one or more management nodes of the plurality of autonomous management nodes.

Furthermore, although not discussed, certificates of authority (e.g., X.509 certificates) can be used in the trust establishment process. In such embodiments, certificates of authority can be sent and/or received in addition to public keys and access tokens as part of the trust establishment process.

Referring now to FIG. 5, shown is a flowchart of an example method 500 of authenticating a request in accordance with some embodiments of the present disclosure. In some embodiments, the method 500 can be executed by one or more processors (e.g., CPUs 305) executing a set of instructions (e.g., trust instructions 328).

The method 500 can begin with operation 510 by receiving a request containing an access token. The request can be received from a sending management node and received by a receiving management node.

In operation 520, the receiving management node can access a public key of the sending management node. The public key can comprise a RSA public key in accordance with some embodiments. According to various embodiments, the public key of the sending management node can be stored in a memory of the receiving management node, or the public key can be accessible to the receiving management node via a network, or the public key can be sent with the request. In some embodiments, a certificate of authority (e.g., X.509 certificate) associated with the sending management node may also be accessed by the receiving management node.

In operation 530, the receiving management node can use the public key and the access token of the sending management node to authenticate the request of the sending management node. In some embodiments, the authenticating can further comprise using a certificate of authority (e.g., X.509 certificate) to authenticate the request. In some embodiments, operation 530 further comprises storing the public key of the sending management node in a memory of the receiving management node. Although not shown, in some embodiments, the method 500 can further comprise issuing an access token to the sending management node to complete a mutual trust relationship.

Referring now to FIG. 6, shown is a flowchart of a method 600 of establishing a trust relationship between a new management node and an offline management node in accordance with some embodiments of the present disclosure. The method 600 can be implemented by one or more processors (e.g., CPUs 305) executing a set of instructions (e.g., trust instructions 328).

The method 600 can begin with operation 610 in which a new management node can determine an existing management node is offline. An offline management node can comprise a management node which is disconnected from the network or otherwise communicatively de-coupled from the plurality of autonomous management nodes. In embodiments, the new management node can identify an existing management node is offline by comparing a set of public keys to the set of management nodes connected to the network. Should there be fewer management nodes connected to the network than public keys, the new management node can determine at least one management node is offline. The new management node can match respective public keys to respective management nodes connected to the network. The unmatched public keys can indicate which management nodes are offline.

In operation 620, the new management node can delay a time interval before determining if the existing management node is online. The time interval can be a static or dynamic time interval based on information contained in the trust instructions 328. For example, the time interval could comprise five seconds. In such an example, the new management node can determine if the existing management node is online every five seconds until the existing management node is determined to be online. In an alternative example, the time interval can be a dynamic time interval and can comprise determining if the existing management node is online every five seconds for twelve hours, and then every 10 seconds for the next twelve hours, and so on in a pattern such that the time interval doubles every predefined duration of time (e.g., twelve hours) up to a maximum time interval (e.g., one hour). It is to be understood that numerous static and dynamic time intervals are possible in accordance with various embodiments of the present disclosure.

In operation 630, the new management node can check the status of the existing management node. The new management node can determine if the existing management node is online by: viewing a status of management nodes connected to the network, by attempting to send a message to the existing management node, or by other strategies useful to determining if a known management node is connected to a network.

Should the new management node determine the existing management node remains offline in operation 630, the new management node can return to operation 620 and delay a time interval. Thus, the method 600 can loop between operations 620 and 630 until the new management node determines the existing management node is online in operation 630.

Should the new management node determine the existing management node is online in operation 630, the method 600 can proceed to operation 650. In operation 650, the new management node can send the existing management node the access token and the public key of the new management node using the public key of the existing management node.

In operation 660, a mutual trust relationship can be established between the existing management node and the new management node. The mutual trust relationship can be a result of the existing management node authenticating the access token and storing the public key of the new management node. In some embodiments, the new management node also sends a certificate of authority to the existing management node. In some embodiments, the existing management node sends an access token to the new management node to establish the mutual trust relationship.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
    sending a request by a new management node associated with a new rack to a first management node associated with a first rack;
        wherein the request includes a public key of the new management node;
        wherein the first management node is associated with a plurality of autonomous management nodes such that a respective mutual trust relationship exists between at least a portion of management nodes of the plurality of autonomous management nodes;
    receiving, by the new management node and from the first management node, a new access token and a set of respective public keys corresponding to a set of respective management nodes of the plurality of autonomous management nodes;
        wherein the new management node issues a first access token to the first management node, and the new management node and the first management node establish a mutual trust relationship based on the first access token and the new access token;

sending, by the new management node and to another respective management node of the set of respective management nodes, the public key of the new management node and the new access token;

establishing, based on the sending, a respective mutual trust relationship between the new management node and the other respective management node receiving the public key of the new management node and the new access token;

receiving, by the new management node and in response to establishing a mutual trust relationship with the other respective management node, a request and a public key associated with a second new management node, wherein the second new management node is associated with a second new rack;

sending, in response to the receiving, a second new access token to the second new management node and a second set of public keys associated with a second set of management nodes of the plurality of autonomous management nodes to the second new management node; and establishing a mutual trust relationship between the new management node and the second new management node based on the second new access token and a third access token issued by the second new management node to the new management node.

2. The method of claim 1, wherein establishing a respective mutual trust relationship between the new management node and the other respective management node further comprises receiving, by the new management node, a respective access token from the other respective management node.

3. The method of claim 1,
wherein sending the public key of the new management node and the new access token to another respective management node of the set of respective management nodes further comprises:
identifying a fourth management node of the set of respective management nodes being offline;
checking, at each first time interval, an online status of the fourth management node;
determining, at a respective first time interval, that the fourth management node is online; and
sending, in response to determining that the fourth management node is online, the public key of the new management node and the new access token to the fourth management node.

4. The method of claim 1, wherein sending, by the new management node and to another respective management node of the set of respective management nodes, the public key of the new management node and the new access token occurs in response to:
identifying, by the new management node, an operation associated with the other respective management node of the set of respective management nodes, wherein no respective mutual trust relationship exists between the new management node and the other respective management node.

5. The method of claim 1, wherein each respective public key comprises a respective RSA public key.

6. The method of claim 1, further comprising:
sending, by the new management node and with the new access token, a request to a second management node of the plurality of autonomous management nodes;
accessing, by the second management node, the public key of the new management node; and
authenticating, in response to the accessing, the request.

7. The method of claim 1, wherein the new access token is digitally signed by a private key of the first management node.

8. A system comprising:
a plurality of autonomous management nodes communicatively coupled to one another, wherein each respective autonomous management node controls operations associated with a respective set of computing devices, and wherein a mutual trust relationship exists between at least a portion of the plurality of autonomous management nodes;
a new management node not associated with the plurality of autonomous management nodes, wherein the new management node comprises a memory and a processor configured to:
send, to a first management node of the plurality of autonomous management nodes, a request including a public key of the first management node;
receive, from the first management node and in response to the request, a new access token and a set of public keys, wherein each respective key of the set of public keys is associated with a respective autonomous management node of the plurality of autonomous management nodes; and
wherein the new management node issues a first access token to the first management node, and wherein the new management node and the first management node establish a mutual trust relationship based on the first access token and the new access token.

9. The system according to claim 8, wherein the new management node is further configured to:
send, to at least a second management node of the plurality of autonomous management nodes and using a public key of the second management node contained in the set of public keys, the public key of the new management node and the new access token; and
establish, in response to sending the public key of the new management node and the new access token to at least the second management node, a mutual trust relationship between the new management node and the second management node.

10. The system of claim 9, wherein the processor configured to send the public key of the new management node and the new access token to at least the second management node is further configured to:
identify the second management node is offline;
check, at each first time interval, an online status of the second management node;
determine, at a respective first time interval, that the second management node is online; and
send, in response to determining that the second management node is online, the public key of the new management node and the new access token to the second management node.

11. The system of claim 8, wherein the processor of the new management node is further configured to:
receive a second request and a public key associated with a second new management node, wherein the second new management node is associated with a second new rack;
wherein the second request is received in response to the new management node establishing a mutual trust relationship with each management node of the plurality of autonomous management nodes;
send, in response to receiving the second request, a second new access token to the second new management node and a second set of public keys associated with a second set of management nodes of the plurality of autonomous management nodes; and establish a mutual trust relationship between the new management node and the second new management node.

12. The system of claim 8, wherein each respective public key comprises a RSA public key.

13. The system of claim 8, wherein the new access token is digitally signed by a private key of the first management node.

14. A computer program product comprising a computer readable storage medium having program instructions embodied therewith, the program instructions executable by a processor to cause the processor to:

send, a request by a new management node associated with a new rack to a first management node associated with a first rack;
   wherein the request includes a public key of the new management node;
   wherein the first management node is associated with a plurality of autonomous management nodes such that a respective mutual trust relationship exists between at least a portion of management nodes of the plurality of autonomous management nodes;

receive, by the new management node and from the first management node, a new access token and a set of respective public keys corresponding to a set of respective management nodes of the plurality of autonomous management nodes;
   wherein the new management node issues a first access token to the first management node, and the new management node and the first management node establish a mutual trust relationship based on the first access token and the new access token;

send, by the new management node and to another respective management node of the set of respective management nodes, the public key of the new management node and the new access token;

establish, based on the sending, a respective mutual trust relationship between the new management node and the other respective management node receiving the public key of the new management node and the new access token;

receive, by the new management node and in response to establishing a mutual trust relationship with the other respective management node, a request and a public key associated with a second new management node, wherein the second new management node is associated with a second new rack;

send, in response to the receiving, a second new access token to the second new management node and a second set of public keys associated with a second set of management nodes of the plurality of autonomous management nodes to the second new management node; and establish a mutual trust relationship between the new management node and the second new management node based on the second new access token and a third access token issued by the second new management node to the new management node.

15. The computer program product of claim 14, wherein the new access token is signed by a private key of the first management node.

16. The computer program product of claim 14, wherein each respective public key comprises a RSA public key.

17. The computer program product of claim 14, wherein each respective rack comprises a respective set of servers.

* * * * *